United States Patent
Vaags et al.

(10) Patent No.: US 7,627,964 B2
(45) Date of Patent: Dec. 8, 2009

(54) SOIL SPREADING SCRAPER DEVICE

(75) Inventors: Adolf Vaags, Dugald (CA); Jeffrey David Schott, Winnipeg (CA); John Wiebe, Niverville (CA)

(73) Assignee: Dynamic Ditchers Inc., Regina, CA (US)

( * ) Notice: Subject to any disclaimer, the term of this patent is extended or adjusted under 35 U.S.C. 154(b) by 0 days.

(21) Appl. No.: 12/019,210

(22) Filed: Jan. 24, 2008

(65) Prior Publication Data

US 2009/0188685 A1  Jul. 30, 2009

(51) Int. Cl.
*E02D 17/13* (2006.01)

(52) U.S. Cl. .............................. 37/94; 37/244; 37/248; 37/253; 172/149

(58) Field of Classification Search ................. 172/48, 172/118, 149, 784, 799.5, 817, 823; 37/248–252, 37/94, 366, 367, 380, 381, 386, 244, 253
See application file for complete search history.

(56) References Cited

U.S. PATENT DOCUMENTS

| | | | | |
|---|---|---|---|---|
| 2,619,746 | A * | 12/1952 | Heaman | 37/251 |
| 2,798,314 | A * | 7/1957 | Brite | 37/94 |
| 3,624,826 | A * | 11/1971 | Rogers | 37/92 |
| 3,673,715 | A * | 7/1972 | Lines | 37/251 |
| 4,192,123 | A * | 3/1980 | Allely | 56/13.6 |
| 5,113,610 | A * | 5/1992 | Liebrecht, Jr. | 37/94 |
| 5,190,140 | A * | 3/1993 | Buschbom | 198/642 |
| 5,864,970 | A * | 2/1999 | Maddock et al. | 37/94 |
| 6,226,903 | B1 * | 5/2001 | Erickson | 37/366 |
| 6,341,435 | B1 * | 1/2002 | Erickson | 37/366 |
| 6,418,647 | B1 * | 7/2002 | Erickson | 37/366 |
| 6,536,140 | B2 * | 3/2003 | Vaags et al. | 37/94 |

* cited by examiner

*Primary Examiner*—Robert E Pezzuto
*Assistant Examiner*—Matthew D Troutman
(74) *Attorney, Agent, or Firm*—Ade & Company Inc.; Ryan W. Dupuis; Kyle R. Satterthwaite (57) ABSTRACT

A soil spreading scraper device comprises a cutting blade for cutting a top layer of soil from the ground, a kicker for throwing the cut soil rearward from the cutting blade, and an impeller member rotatable within a plane of rotation extending upward and rearward from the cutting blade for capturing the soil thrown by the kicker and spreading the cut soil generally radially outward relative to an axis of rotation of the impeller. A gearbox which receives power from a power takeoff of a towing vehicle directly drives the rotation of the impeller member in the preferred embodiment. The blades of the impeller members may include recessed portions adjacent the impeller axis in some embodiments to encourage soil being received in the impeller member even at higher rates of rotation, for example in the range of 250 to 320 RPM.

18 Claims, 4 Drawing Sheets

SOIL SPREADING SCRAPER DEVICE

FIELD OF THE INVENTION

The present invention relates to a soil spreading scraper device which is arranged to cut a top layer of soil from the ground as the device is displaced along the ground in a forward working direction and which is arranged to spread the cut soil transversely to the forward working direction.

BACKGROUND

In some situations it is required to pick up soil at one location and transport it to another. In the case of road building for instance, the contour of the ground is changed to form a road by taking the soil from one location and placing it in another. Not only must the soil be removed from one location, it must also be placed in another specific location.

In many situations however, it is only desired to remove the soil from its current location, and the location it is moved to is not critical. Often it is desired to simply spread the removed soil so that it does not interfere with future operations on the land. An example is where ditches are made to drain standing water from ponds on agricultural lands.

Conventional soil moving machines include scrapers and loaders, where a generally horizontal blade is moved at a shallow depth along the ground, lifting soil and moving same into a bucket where it remains until dumped. Scrapers may incorporate a chain elevator to assist in moving the soil into the bucket. Trenchers or ditchers generally move the soil from the trench and pile it beside the trench, although ditchers are also known which spread the soil that is removed. Such soil-spreading ditchers are disclosed in U.S. Pat. No. 3,624,826 to Rogers, U.S. Pat. No. 5,237,761 to Nadeau et al., U.S. Pat. No. 5,113,610 to Liebrecht et al., and U.S. Pat. No. 6,226,903B1 to Erickson.

The ditch cleaning apparatus of Rogers comprises a disc rotating in a substantially vertical plane. The apparatus rides on skids and is designed essentially to clean existing ditches. The ditcher of Nadeau et al. similarly comprises a disc rotating in a substantially vertical plane and having rippers ahead of the disc. The disc of Nadeau et al. disperses the soil loosened by the rippers. The apparatuses of Rogers and Nadeau et al. leave a ditch with a rounded bottom having a radius substantially equal to the radius of the disc.

The apparatus of Liebrecht et al. uses a spinning disc to both cut and spread the soil. The plane of the disc is oriented at a shallow angle of 15-30 degrees above horizontal, and a shallow angle to one side of 10-30 degrees.

The apparatus of Erickson uses a blade to scrape up soil and deposit it onto a spinning disc that has a plane oriented at less than 45 degrees above horizontal. The blade raises the soil onto a pan and then the soil passes over the pan and onto the disc which has an edge that is juxtaposed to a semi-circular cut-out in the pan. The disc rotates at a relatively shallow angle so that the soil is not raised very much before it is thrown off the disc. A beater may be provided above the pan to push the raised soil down onto the disc as it leaves the pan.

U.S. Pat. No. 6,536,140 belonging to Vaags et al is another example of a soil spreading scraper including a blade to scrape up soil and a spinning disc for spreading the cut soil.

In the devices belonging to both to Erickson and Vaags et al., power to rotate the spinning disc is provided through a power takeoff of a towing vehicle to a gearbox having output which is misaligned from the central axis of the spinning disc so that variable angle joints are required in the drive between the output of the gearbox and the disc which affect the smoothness of the fan rotation and thus the operating efficiency thereof.

SUMMARY OF THE INVENTION

According to one aspect of the invention there is provided a soil spreading scraper device comprising:

a frame supported for movement along the ground in a forward working direction;

an impeller member supported on the frame for rotation about an impeller axis within a plane of rotation lying generally perpendicularly to the impeller axis, the plane of rotation extending generally upward and rearward;

a cutting blade supported on the frame forwardly and downwardly relative the impeller member and arranged to cut a top layer of soil from the ground as the frame is displaced in the forward working direction;

a kicker supported on the frame for rotation about a kicker axis spanning above the cutting blade transversely to the forward working direction and arranged to propel soil cut by the cutting blade generally rearward onto the impeller member;

the impeller member comprising a plurality of impeller blades arranged to spread soil deposited on the impeller member generally radially outward from the impeller axis as the impeller member is rotated;

an impeller gearbox comprising an input shaft and an output shaft geared to rotate with rotation of the input shaft;

the input shaft of the impeller gearbox being arranged to be coupled to drive source to receive a driving rotation;

the output shaft of the impeller gearbox being coupled to the impeller member; and the output shaft being parallel to the impeller axis.

By providing a gearbox in a ditcher of the type including both a impeller member and a kicker in which the gearbox output is parallel to the impeller axis, the gearbox output can be directly coupled without any variable angle connectors. The rotation of the impeller member is thus accomplished with optimum efficiency and transfer of power by direct coupling for maximizing the amount and the distance that the cut soil can be spread by the impeller member. When providing the direct driving of the impeller member with a lower pan which directs material from the cutting blade to the impeller member, an additional feature of recessed portions on the impeller blades can allow for even greater volumes of cut soil into the impeller member, and, the impeller member can be operated at even greater RPMs relative to prior art configurations. By further providing a replaceable liner on a peripheral wall or on the blades of the impeller member, a lower friction material can be taken advantage of which can be maintained in optimal condition, thus further improving efficiency of the impeller member rotation.

Preferably the output shaft and the impeller member are directly coupled so as to be fixed relative to one another for rotation together about the impeller axis.

In the illustrated embodiment, the input shaft of the impeller gearbox is perpendicular to the forward working direction. In this instance, there may be provided a secondary gearbox which is offset laterally from the impeller gearbox in relation to the forward working direction. Preferably the secondary gearbox is directly coupled to the input shaft of the impeller gearbox and is arranged to receive the driving rotation from the drive source, for example the PTO of a towing vehicle, to drive the impeller gearbox.

When using the device with a towing vehicle arranged to tow the frame in the forward working direction and having a power take off arranged to provide the driving rotation, there may be provided a drive shaft supported on the frame and arranged to be coupled to the power take off of the towing vehicle through a first variable angle connector and coupled to the secondary gearbox through a second variable angle connector.

The secondary gearbox may include a first output coupled to the impeller gearbox for driving the impeller member and a second output coupled to the kicker for driving rotation of the kicker.

Alternatively, there may be provided a motor supported on the frame and arranged to provide the driving rotation to the impeller gearbox, while the rotation of the kicker is driven by a drive source independent of the impeller member. Preferably the kicker drive arranged to drive rotation of the kicker relative to the frame is driven by the power take off of the towing vehicle and the impeller drive is driven by the motor supported on the frame.

According to another aspect of the present invention there is provided a soil spreading scraper device comprising:

a frame supported for movement along the ground in a forward working direction;

an impeller member supported on the frame for rotation about an impeller axis within a plane of rotation lying generally perpendicularly to the impeller axis, the plane of rotation extending generally upward and rearward at an angle between 45 degrees and 75 degrees above horizontal;

a cutting blade supported on the frame forwardly and downwardly relative the impeller member and arranged to cut a top layer of soil from the ground as the frame is displaced in the forward working direction;

a kicker supported on the frame for rotation about a kicker axis spanning above the cutting blade transversely to the forward working direction and arranged to propel soil cut by the cutting blade generally rearward onto the impeller member;

the impeller member comprising a plurality of impeller blades arranged to spread soil deposited on the impeller member generally radially outward from the impeller axis as the impeller member is rotated;

an impeller drive arranged to rotate the impeller member about the impeller axis at a rate between 250 and 300 revolutions per minute.

More optimally, the impeller drive is preferably arranged to rotate the impeller member about the impeller axis at a rate of approximately 270 revolutions per minute.

According to yet another aspect of the present invention there is provided a soil spreading scraper device comprising:

a frame supported for movement along the ground in a forward working direction;

an impeller member supported on the frame for rotation about an impeller axis within a plane of rotation lying generally perpendicularly to the impeller axis, the plane of rotation extending generally upward and rearward at an angle between 45 degrees and 75 degrees above horizontal;

a cutting blade supported on the frame forwardly and downwardly relative the impeller member and arranged to cut a top layer of soil from the ground as the frame is displaced in the forward working direction;

a kicker supported on the frame for rotation about a kicker axis spanning above the cutting blade transversely to the forward working direction and arranged to propel soil cut by the cutting blade generally rearward onto the impeller member;

the impeller member comprising a plurality of impeller blades arranged to spread soil deposited on the impeller member generally radially outward from the impeller axis as the impeller member is rotated;

an impeller drive arranged to drive rotation of the impeller member relative to the frame; and a kicker drive arranged to drive rotation of the kicker relative to the frame;

the kicker drive and the impeller drive being independent of one another.

The impeller drive may be driven by a motor supported on the frame in this instance.

The frame may be arranged for connection to a towing vehicle having a power take off and the kicker drive is arranged to be driven by the power take off of the towing vehicle.

According to a further aspect of the present invention there is provided a soil spreading scraper device comprising:

a frame supported for movement along the ground in a forward working direction;

an impeller member supported on the frame for rotation about an impeller axis within a plane of rotation lying generally perpendicularly to the impeller axis, the plane of rotation extending generally upward and rearward at an angle between 45 degrees and 75 degrees above horizontal;

a cutting blade supported on the frame forwardly and downwardly relative the impeller member and arranged to cut a top layer of soil from the ground as the frame is displaced in the forward working direction; a kicker supported on the frame for rotation about a kicker axis spanning above the cutting blade transversely to the forward working direction and arranged to propel soil cut by the cutting blade generally rearward onto the impeller member;

the impeller member comprising a plurality of impeller blades spanning generally upward from a bottom side of the impeller member in a direction of the impeller axis;

the impeller blades being arranged to spread soil deposited on the impeller member generally radially outward from the impeller axis as the impeller member is rotated;

at least one of the impeller blades comprising a recessed portion in which the blade is shorter from the bottom side of the impeller member in the direction of the impeller axis than a remaining portion of the blade.

The recessed portion of the impeller blades are preferably adjacent the impeller axis.

The impeller blades having a recessed portion preferably gradually increase in height relative to the bottom side of the impeller member from the recessed portion adjacent the impeller axis to the remaining portion of the blade.

The impeller blades with recessed portions preferably comprise alternate ones of the impeller blades in a circumferential direction about the impeller member.

According to yet a further aspect of the present invention there is provided a soil spreading scraper device comprising:

a frame supported for movement along the ground in a forward working direction;

an impeller member supported on the frame for rotation about an impeller axis within a plane of rotation lying generally perpendicularly to the impeller axis, the plane of rotation extending generally upward and rearward at an angle between 45 degrees and 75 degrees above horizontal;

a cutting blade supported on the frame forwardly and downwardly relative the impeller member and arranged to cut a top layer of soil from the ground as the frame is displaced in the forward working direction;

a kicker supported on the frame for rotation about a kicker axis spanning above the cutting blade transversely to the forward working direction and arranged to propel soil cut by the cutting blade generally rearward onto the impeller member;

the impeller member comprising a plurality of impeller blades arranged to spread soil deposited on the impeller member generally radially outward from the impeller axis as the impeller member is rotated; and at least one wear member of wear resistant material supported adjacent the impeller member so as to be arranged to engage the soil spread by the impeller member, the wear member being mounted so as to be readily separable from device for replacement.

The wear member may comprise a plurality of wear members, each arranged to be supported on a respective one of the impeller blades for rotation about the impeller axis therewith.

When there is provided a perimeter wall extending circumferentially partway about the impeller member, there may also be provided a wear member arranged to be supported against the perimeter wall.

Some embodiments of the invention will now be described in conjunction with the accompanying drawings in which.

BRIEF DESCRIPTION OF THE DRAWINGS

In the drawings like characters of reference indicate corresponding parts in the different figures.

DETAILED DESCRIPTION

Referring to the accompanying figures there is illustrated a soil spreading scraper device generally indicated by reference numeral 10. The device 10 is particularly suited for cutting a top layer of soil from the ground as the device is advanced in a forward working direction across the ground and for spreading the cut soil laterally outward to one side relative to the forward working direction.

In the illustrated embodiment, the device 10 includes a frame which is suitable for towing by a towing vehicle such as a tractor including a suitable hitch 12 and power takeoff 14.

The frame 16 of the device 10 includes a main body from which a hitch arm 18 projects forwardly towards a hitch connector 20 at a forward end thereof suitable for connection to the hitch 12 of the towing vehicle. The main body is supported at a rear end by a pair of wheels 22 which are laterally spaced apart at the rear end of the main body. The wheels 22 are supported for independent height adjustment relative to the main body for adjusting the overall height of the frame, which in turn adjusts the depth of cut of the device into the soil, and for adjusting the inclination of the frame relative to the ground which adjusts an angle of cut of the device into the ground.

The device 10 generally comprises a cutting blade 24 spanning laterally across the frame for cutting the top layer of soil from the ground, an impeller member 26 which spreads the soil cut by the cutting blade 24 and a kicker 44 for propelling the soil cut by the cutting blade 24 onto the impeller member 26.

The cutting blade 24 spans along the front edge of the main body of the frame 16, along the bottom side thereof, to extend downwardly and forwardly to a cutting edge which spans generally horizontally and perpendicularly to the forward working direction. A pan 30 extends rearwardly and upwardly from the cutting blade 24 towards the impeller member 26 which is positioned rearwardly of the soil cutting blade 24.

The impeller member 26 generally comprises a disc defining a bottom side 32 of the impeller member which rotates within a rotation plane oriented perpendicularly to an impeller axis about which the impeller member rotates relative to the frame. The impeller member is supported on the frame so that the rotation plane extends at an upward and rearward angle from a location rearward of the cutting blade 24 at an angle of near 75° from the ground in the illustrated embodiment, though a rotation plane generally in the range of 45° to 75° can still be beneficial.

The impeller member includes a plurality of impeller blades 34 which are each fixed on the disc at the bottom side 32 of the impeller member to extend both radially outward from the impeller axis to a periphery of the impeller member and to extend upwardly from the disc at the bottom side 32 generally in the direction of the impeller axis to an open top side 36 of the impeller member. The blades and the disc at the bottom side 32 of the impeller member are fixed for rotation together about the impeller axis so as to spread cut soil deposited on the impeller member generally radially outward relative to the impeller axis.

A peripheral wall 38 is provided about a bottom portion of the periphery of the impeller member 26 having a height which spans between the top and bottom sides of the impeller member. An inner surface of the peripheral wall 38 against which the impeller member periphery rotates comprises a wear member 39 having a low coefficient of friction. The wear member 39 is mounted on the peripheral wall for ready separation and replacement thereof to maintain the wear member in optimal low friction condition. Periodic replacement of the wear member 39 reduces friction of soil being spread by the impeller member as it is rotated along the inner surface of the peripheral wall 38 and thus minimizes friction against rotation of the impeller member. An upper portion of the periphery about the impeller member openly communicates with discharge chutes 40 curving upwardly and laterally outward so that the material thrown radially outward by the impeller member is thrown onto the chutes 40 and redirected generally laterally outward in a sideways direction which is generally perpendicular to the forward working direction.

The pan 30 terminates at a rear edge 42 which is semicircular about a centre at the impeller axis so that the edge 42 follows the shape of the peripheral wall 38 about a periphery of the impeller member 26.

A kicker 44 is provided which is supported for rotation on the frame about a respective kicker axis which extends generally horizontally, transversely and perpendicularly to the forward working direction, at a location which is spaced above and rearward of the cutting blade 24, while being located forwardly of the impeller member, bellow the impeller axis.

The kicker 44 includes a shaft 46 extending along the kicker axis and arranged for supporting a plurality of kicker blades 48 extending generally radially outward therefrom. The plurality of kicker blades 48 are provided at circumferentially and axially spaced positions relative to one another with suitable dimensions to rotate in close proximity to the pan so that any soil cut by the cutting blade and lifted onto the pan is engaged by the kicker blades 48 which rotate rearwardly at a bottom side thereof to propel the cut soil rearwardly onto the impeller member.

The kicker blades 48 are oriented to project or propel the cut soil laterally inward towards a center of the kicker as it is thrown rearward onto the impeller member. Due to the pan being terminated at a rearward edge at the front side of the impeller member and the high angle of elevational of the impeller member relative to the ground, the material thrown rearward by the kicker is projected onto a very large portion of the surface of the impeller member to encourage capturing a maximum volume of soil to be subsequently spread by the impeller member. The combination of the high angle impeller member and low rear edge of the pan further promotes rotation of the impeller member at higher revolutions per minute (RPM) as compared to prior art configurations generally in the range of 250 to 300 RPM.

Figure 1:
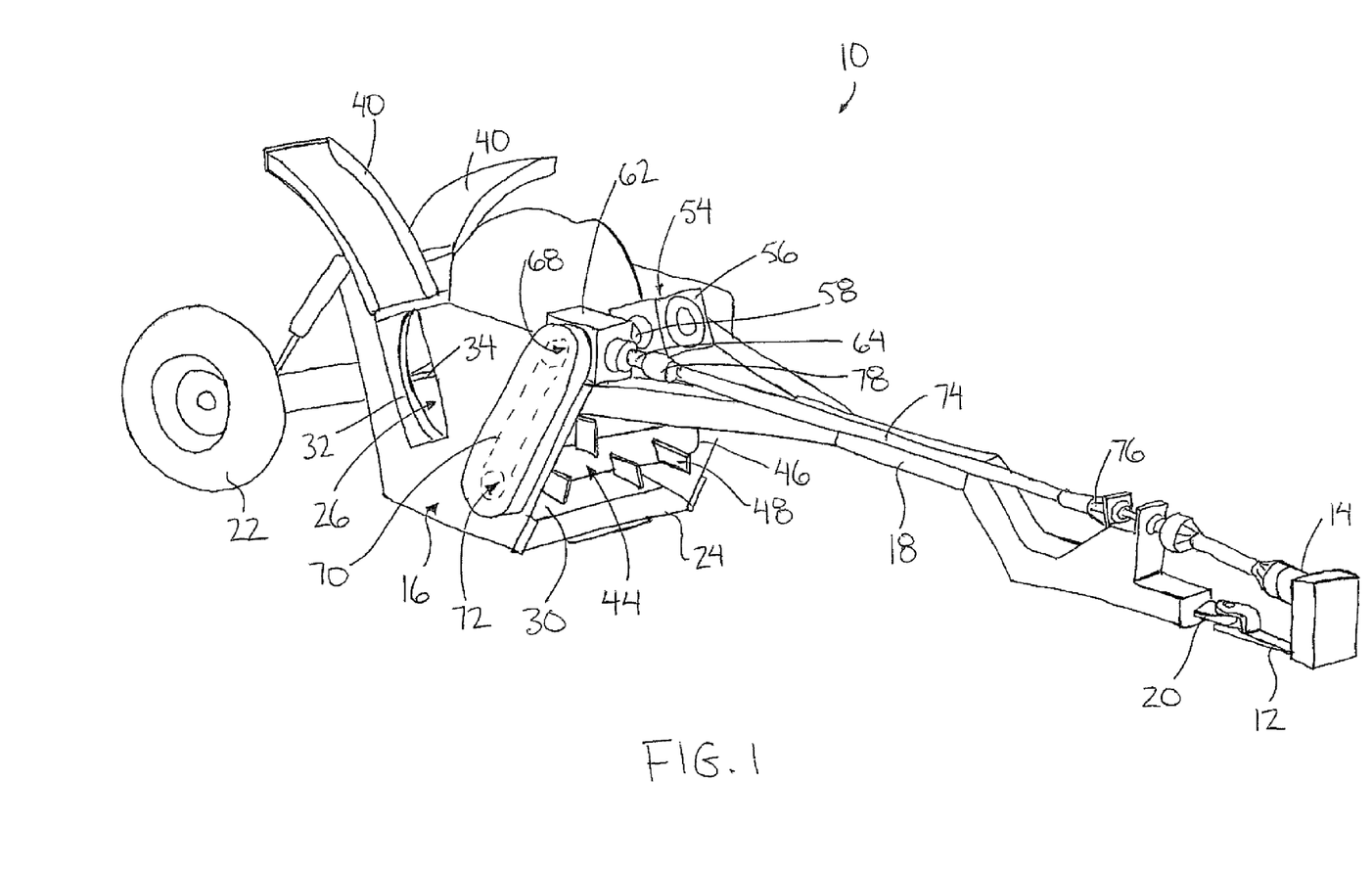
FIG. 1 is a perspective view of the soil spreading scraper device.
Figure 2:
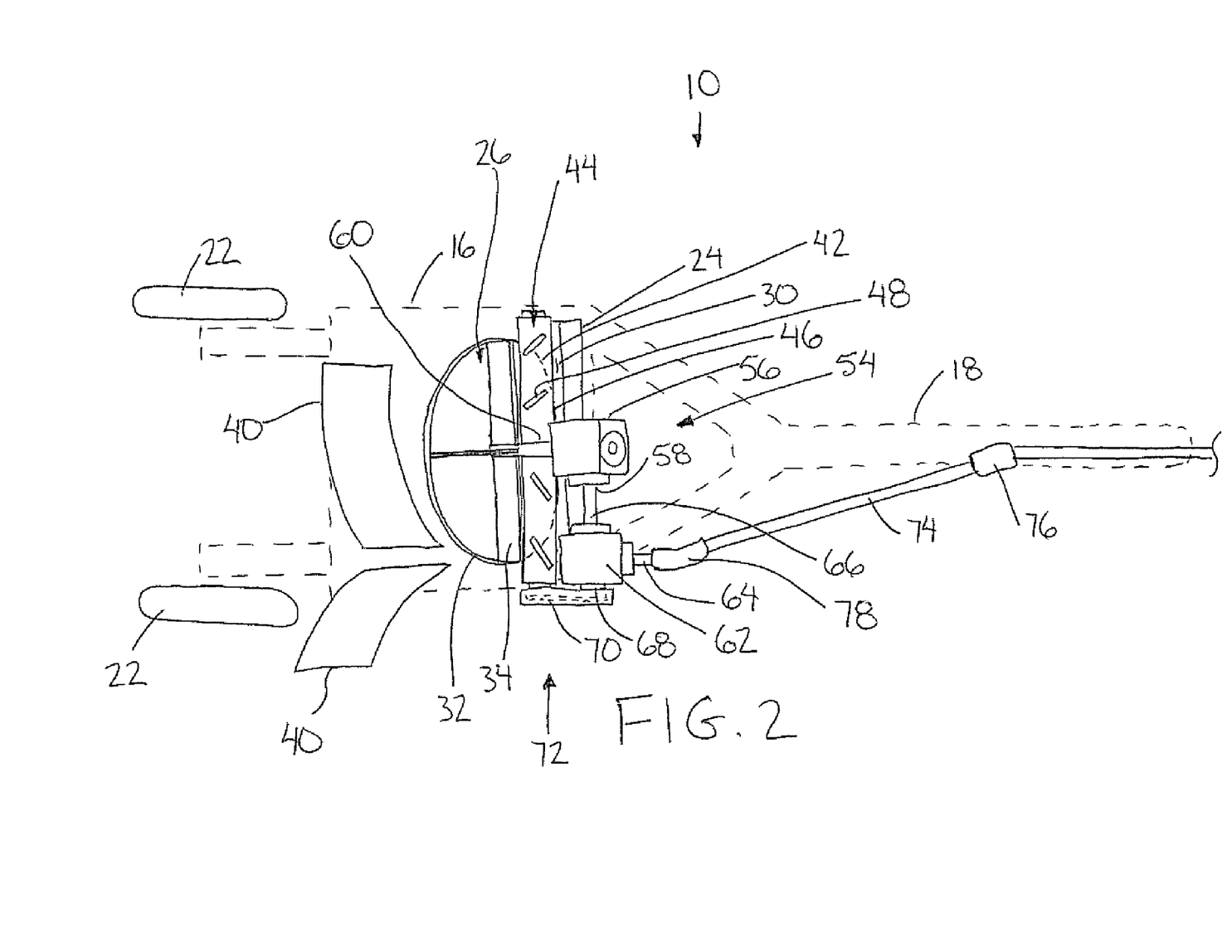
FIG. 2 is a plan view of the impeller drive and the kicker drive relative to the frame of the device which is shown schematically in broken lines.
Figure 3:
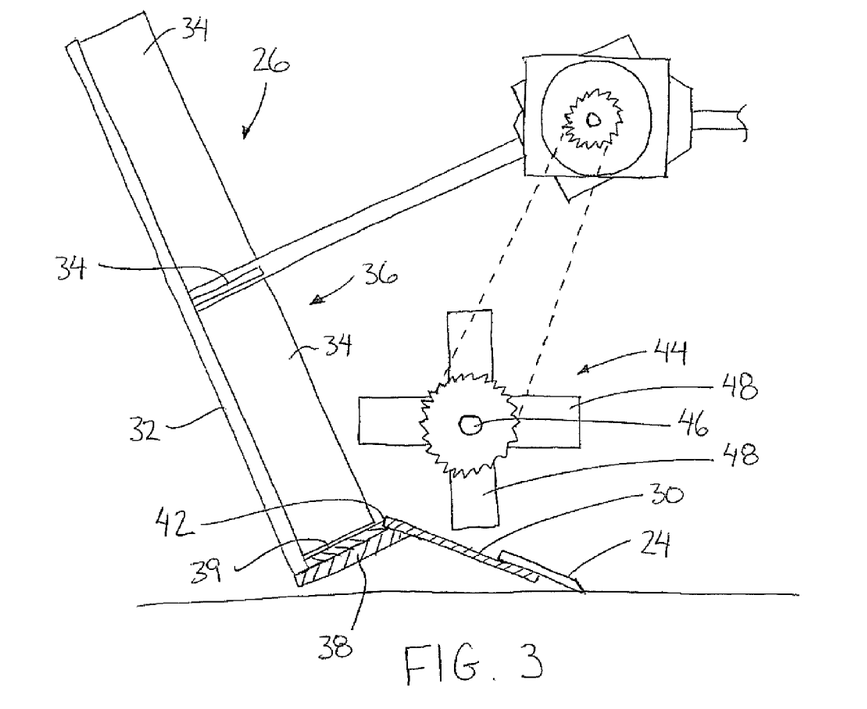
FIG. 3 is a partly sectional elevational view of the impeller member, the kicker member, the kicker drive and the impeller drive.
Figure 4:
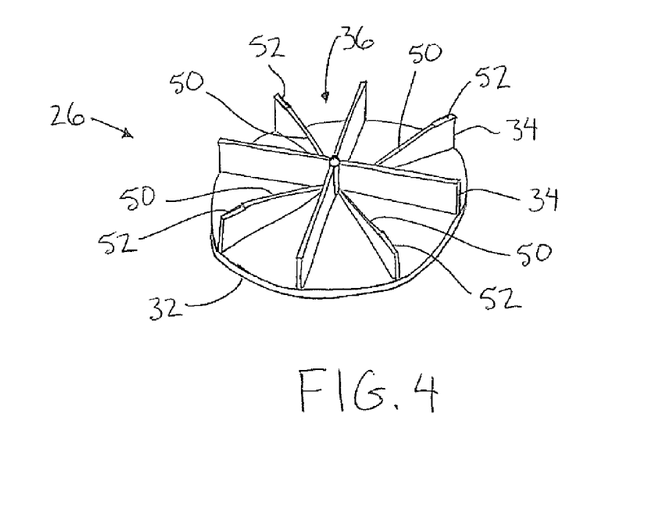
FIG. 4 is a perspective view of the impeller member shown separated from the scraper device according to one embodiment of the present invention.
Figure 5:
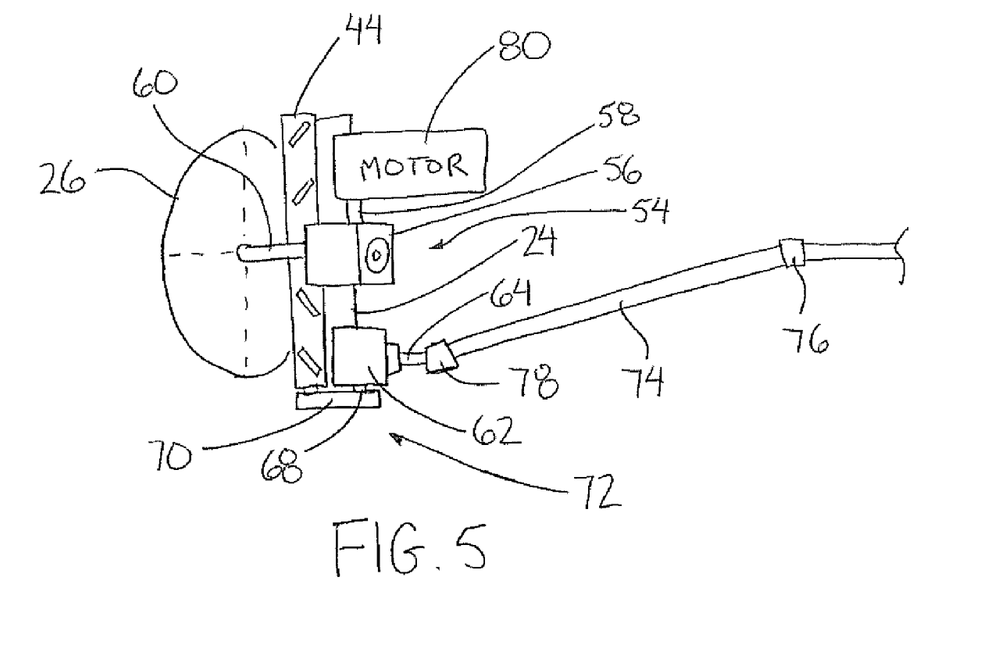
FIG. 5 is a schematic plan view of the impeller drive and the kicker drive according to an alternative embodiment of the present invention.

As shown in the illustrated embodiment according to FIG. 4, some of the impeller blades 34 include a recessed portion 50 which permits the impeller member to capture yet further soil deposited thereon even when operated at higher RPM than the prior art. The recessed portion 50 of the blades comprise a portion of the blade where the blade is shorter relative to the bottom side in the direction of the impeller axis relative to a remaining portion 52 of the blade which spans a full height of the impeller blade between the bottom and top sides thereof. The recessed portions 50 are provided adjacent the impeller axis with height of the impeller blades increasing gradually relative to the bottom side of the impeller member from the recess portion 50 to the remaining portion 52 of the blade situated at a periphery of the impeller member. The blades which do not have a recessed portion 50 have a constant height between the impeller axis and the periphery which is approximately the height of the remaining portion 52 of the other blades. When viewed from above, each second one of the impeller blades, comprising alternating ones of the blades in the circumferential direction, includes one of the recessed portions 50 at the inner end thereof relative to the remaining portion 52 at the periphery thereof.

Figure 6:
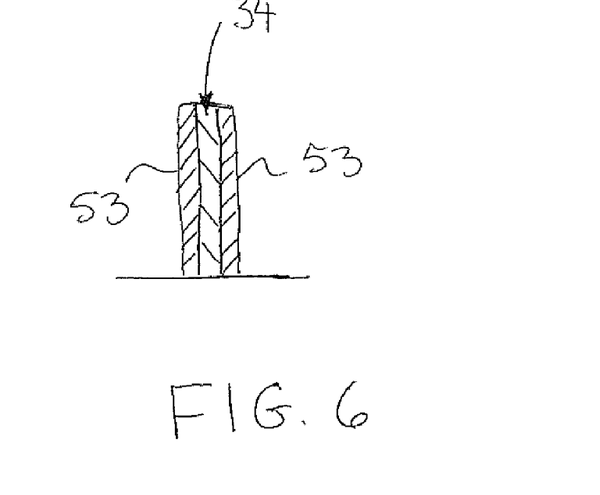
FIG. 6 is a sectional view of one of the impeller blades.

In one embodiment of impeller blades shown in FIG. 6, a wear member 53 is supported on each of the two opposing surfaces of each impeller blade 34. Similarly to the wear member 39 noted above, the wear members 53 of the impeller blades each comprise a material having a low coefficient of friction and each are supported so as to be readily separated and replaced as desired to maintain the wear members in optimal low friction condition.

An impeller drive 54 is provided for receiving a driving rotation from a drive source comprising the power takeoff 14 of the towing vehicle. The impeller drive comprises an impeller, a gearbox 56 having an input shaft 58 oriented generally horizontally and perpendicular to the forward working direction, and an output shaft 60 which is geared to rotate with the input shaft rotation at a prescribed ratio and which is directly coupled to the impeller member at the axis thereof. The output shaft 60 is parallel such that the output axis is coaxial with the impeller axis so that the output shaft 60 of the impeller gearbox 56 and the impeller member can be directly coupled to one another in fixed relative orientation without any variable angle connectors therebetween.

The input shaft 58 receives the driving rotation from the drive source through an auxiliary gearbox 62 having an input shaft 64 oriented in the forward working direction and projecting forwardly towards the power takeoff 14 of the towing vehicle. The auxiliary gearbox 62 is laterally offset in relation to the forward working direction from the impeller gearbox 56 so that a first output shaft 66 of the auxiliary gearbox is parallel and coaxial with the input shaft 58 of the impeller gearbox with which it is directly coupled so that the first output shaft 66 is also oriented generally horizontally and perpendicular to the forward working direction.

The auxiliary gearbox also includes an opposing second output shaft 68 extending horizontally outward in the opposing direction relative to the first output shaft 66 so that the two output shafts are generally concentric with one another. The second output shaft 68 is coupled via a drive chain 70 to one end of the shaft of the kicker 44 so as to define a kicker drive 72 which drives the rotation of the kicker about its respective kicker axis from the driving rotation provided by the power takeoff 14 of the driving vehicle.

A drive shaft 74 is provided for coupling between the input shaft 64 of the auxiliary gearbox 62 and the power takeoff 14 of the tractor. The drive shaft 74 is provided with a first variable angle connector 76 in the form of a universal joint (U-joint) at a forward end for connection of the drive shaft to the power takeoff 14. The drive shaft 74 is connected at a rear end by a second variable angle connector 78 also comprising a U-joint which connects the drive shaft to the input shaft 64 of the auxiliary gearbox.

In the configuration described in the first illustrated embodiment, the towing vehicle produces a driving rotation which is transferred from the power takeoff 14 of the vehicle through the drive shaft 74, to the auxiliary gearbox 62 which in turn drives the impeller member through the impeller gearbox 56 and the kicker 44 through the drive chain 70.

In use, the device 10 is connected to the hitch of a towing vehicle and is towed in the forward working direction across the ground. Height of the frame relative to the ground is adjusted to cut an appropriate thickness of a top layer of soil from the ground using the cutting blade 24. The cutting blade lifts the top layer of soil onto the pan where the kicker blades of the kicker rotate to propel the cut soil rearwardly onto the open top side of the impeller member whose rotation spreads the cut soil deposited thereon generally radially outward from the impeller axis onto the chutes 40 which project the soil laterally outward in a sideways direction generally perpendicular to the forward working direction, but at a slight rearward incline.

Turning now to a further embodiment of the impeller drive, as shown in FIG. 6, the device 10 is shown with a motor 80 being supported on the frame for movement therewith across the ground. An impeller gearbox 56 is similarly provided with an output shaft which directly couples to the impeller member as in the previous embodiment; however, the input shaft of the gearbox 66 in this instance projects horizontally outwardly for direct coupling to the motor 80 positioned laterally to one side of the gearbox. Greater power can thus be provided for directly driving rotation of the impeller member without the use of any variable angled joints which can affect the smoothness of rotation of the impeller member and thus the efficiency thereof. In the alternative embodiment shown in FIG. 6, the drive shaft 74 and auxiliary gearbox 62 are configured similarly to the previous embodiment with respect to the second output 68 which is coupled by the chain drive 70 to the shaft 46 of the kicker to rotate the kicker independently of the impeller drive 54 comprising the motor 80.

Since various modifications can be made in my invention as herein above described, and many apparently widely different embodiments of same made within the spirit and scope The invention is claimed is:

1. A soil spreading scraper device comprising:
 a frame supported for movement along the ground in a forward working direction;
 an impeller member supported on the frame for rotation about an impeller axis within a plane of rotation lying generally perpendicularly to the impeller axis, the plane of rotation extending generally upward and rearward;
 a cutting blade supported on the frame forwardly and downwardly relative the impeller member and arranged to cut a top layer of soil from the ground as the frame is displaced in the forward working direction;
 a kicker supported on the frame for rotation about a kicker axis spanning above the cutting blade transversely to the forward working direction and arranged to propel soil cut by the cutting blade generally rearward onto the impeller member;
 the impeller member comprising a plurality of impeller blades arranged to spread soil deposited on the impeller member generally radially outward from the impeller axis as the impeller member is rotated;
 an impeller gearbox comprising an input shaft and an output shaft geared to rotate with rotation of the input shaft;
 the impeller gearbox being oriented such that an output axis of the impeller gearbox is coaxial with the impeller axis and the output shaft is parallel to the impeller axis;
 the output shaft of the impeller gearbox being directly coupled to the impeller member such that the output shaft of the impeller gearbox and the impeller are fixed relative to one another for rotation together about the impeller axis without any variable angle connectors being coupled between the impeller gearbox and the impeller member; and
  the input shaft of the impeller gearbox being perpendicular to the forward working direction; and
 a secondary gearbox offset laterally from the impeller gearbox in relation to the forward working direction;
  the secondary gearbox having an output shaft which is directly coupled to the input shaft of the impeller gearbox; and
  the secondary gearbox having an input shaft oriented in the forward working direction so as to be arranged to receive a driving rotation from a drive source to drive the impeller gearbox and the impeller member.

2. The device according to claim 1 for use with a towing vehicle arranged to tow the frame in the forward working direction and having a power take off arranged to provide the driving rotation, wherein there is provided a drive shaft supported on the frame and arranged to be coupled to the power take off of the towing vehicle through a first variable angle connector and being coupled to the secondary gearbox through a second variable angle connector.

3. The device according to claim 1 wherein the secondary gearbox includes a first output coupled to the impeller gearbox for driving the impeller member and a second output coupled to the kicker for driving rotation of the kicker.

4. The device according to claim 1 wherein the impeller member comprises a plurality of impeller blades spanning generally upward from a bottom side of the impeller member in a direction of the impeller axis; the impeller blades being arranged to spread soil deposited on the impeller member generally radially outward from the impeller axis as the impeller member is rotated; and at least one of the impeller blades comprising a recessed portion in which the blade is shorter from the bottom side of the impeller member in the direction of the impeller axis than a remaining portion of the blade.

5. The device according to claim 4 wherein the recessed portion of said at least one of the impeller blades is adjacent the impeller axis.

6. The device according to claim 5 wherein said at least one of the impeller blades gradually increases in height relative to the bottom side of the impeller member from the recessed portion adjacent the impeller axis to the remaining portion of the blade.

7. The device according to claim 1 wherein there is provided at least one wear member of wear resistant material supported adjacent the impeller member so as to be arranged to engage the soil spread by the impeller member, the wear member being mounted so as to be readily separable from device for replacement.

8. The device accordingly to claim 7, wherein said at least one wear member comprises a plurality of wear members, each arranged to be supported on a respective one of the impeller blades for rotation about the impeller axis therewith.

9. The device accordingly to claim 7 wherein there is provided a perimeter wall extending circumferentially partway about the impeller member and wherein said at least one wear member is arranged to be supported against the perimeter wall.

10. A soil spreading scraper device comprising:
 a frame supported for movement along the ground in a forward working direction;
 an impeller member supported on the frame for rotation about an impeller axis within a plane of rotation lying generally perpendicularly to the impeller axis, the plane of rotation extending generally upward and rearward at an angle between 45 degrees and 75 degrees above horizontal;
 a cutting blade supported on the frame forwardly and downwardly relative the impeller member and arranged to cut a top layer of soil from the ground as the frame is displaced in the forward working direction;
 a kicker supported on the frame for rotation about a kicker axis spanning above the cutting blade transversely to the forward working direction and arranged to propel soil cut by the cutting blade generally rearward onto the impeller member;
 the impeller member comprising a plurality of impeller blades spanning generally upward from a bottom side of the impeller member in a direction of the impeller axis;
 the impeller blades being arranged to spread soil deposited on the impeller member generally radially outward from the impeller axis as the impeller member is rotated;
 only some of the impeller blades comprising recessed blades which comprises a recessed portion at an inner end adjacent the impeller axis in which the blade is shorter from the bottom side of the impeller member in the direction of the impeller axis than a remaining portion of the blade so as to be recessed in relation to the remaining portion of the blade and so as to be recessed in relation to other ones of the blades at the inner end thereof.

11. The device according to claim 10 wherein there is provided a motor supported on the frame and arranged to provide the driving rotation to an impeller gearbox, the rotation of the kicker being driven by a drive source independent of the impeller member.

12. The device according to claim 10 wherein the frame is arranged for connection to a towing vehicle having a power take off and wherein there is provided an impeller drive arranged to drive rotation of the impeller member relative to the frame and a kicker drive arranged to drive rotation of the kicker relative to the frame, the kicker drive being arranged to be driven by the power take off of the towing vehicle and the impeller drive being driven by a motor supported on the frame.

13. The device according to claim 10 wherein there is provided an impeller drive arranged to rotate the impeller member about the impeller axis at a rate between 250 and 300 revolutions per minute.

14. The device according to claim 10 wherein there is provided an impeller drive arranged to drive rotation of the impeller member relative to the frame; and a kicker drive arranged to drive rotation of the kicker relative to the frame; the kicker drive and the impeller drive being independent of one another.

15. The device according to claim 10 wherein said recessed impeller blades gradually increases in height relative to the bottom side of the impeller member from the recessed portion adjacent the impeller axis to the remaining portion of the blade.

16. The device according to claim 10 wherein the recessed blades and said other ones of the blades are alternating with one another in a circumferential direction about the impeller member.

17. The device according to claim 10 wherein said other ones of the blades have a constant height relative to the bottom side of the impeller between the impeller axis and the periphery.

18. The device according to claim 17 wherein the constant height is approximately a height of the remaining portion of the recessed blades.

* * * * *